(12) United States Patent
Trewin

(10) Patent No.: US 6,948,136 B2
(45) Date of Patent: Sep. 20, 2005

(54) SYSTEM AND METHOD FOR AUTOMATIC CONTROL DEVICE PERSONALIZATION

(75) Inventor: Sharon M. Trewin, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 10/342,002

(22) Filed: Jan. 14, 2003

(65) Prior Publication Data

US 2004/0064597 A1 Apr. 1, 2004

Related U.S. Application Data

(60) Provisional application No. 60/415,165, filed on Sep. 30, 2002.

(51) Int. Cl.[7] ................................................. G06F 3/00
(52) U.S. Cl. .................... 715/865; 713/100; 710/14; 710/16; 700/17; 700/47; 345/157; 345/163; 345/168; 341/21; 341/22
(58) Field of Search .............................. 700/17, 47, 83; 710/8, 10, 14–16, 104; 715/865, 866; 345/156, 157, 163, 168; 713/1, 2, 100; 341/22, 23

(56) References Cited

U.S. PATENT DOCUMENTS

| 5,692,140 A | * | 11/1997 | Schmitt et al. ............. 715/856 |
| 2002/0118223 A1 | * | 8/2002 | Steichen et al. |
| 2004/0010328 A1 | * | 1/2004 | Carson et al. |

OTHER PUBLICATIONS

Lynds, J.S.; "DARCI TOO—A Computer Input Device for People with Disabilities"; Proceedings of the Johns Hopkins National Search for Computing Applications to Assist Persons with Disabilities; Feb. 1–5, 1992; pp.: 110–112.*

C. Stephanidis, et al., "Adaptable and Adaptive User Interfaces for Disabled Users in the AVANTI Project", in *Intelligence in Services and Networks; Technology for Ubiquitous Telecom Services. 5th International Conference on Intelligence in Services and Networks, IS & N 98 Proceedings*, Springer–Verlag, 153–166 (1998).

S. Trewin, "Towards Intelligent, Adaptive Input Devices for Users with Physical Disabilities", PhD Thesis. University of Edinburgh, Great Britain; pp. ii–viii and 236–241, (1998).

S. Trewin, "Configuration Agents, Control and Privacy", In Proceedings of the 1st ACM Conference on Universal Usability, Nov. 15–17, Washington DC, USA, Abstract and pp. 2–8, ACM Press (2000).

(Continued)

*Primary Examiner*—Anthony Knight
*Assistant Examiner*—Crystal J. Barnes
(74) *Attorney, Agent, or Firm*—Scully, Scott, Murphy & Presser; Daniel P. Morris, Esq.

(57) ABSTRACT

A system and method for improving the usability of electronic products. Control devices such as keyboards, mice, and switches, for example, are often accompanied by software which allows users to configure the device response to suit their physical abilities, situation and task. The system and method enables automatic configuration of such control devices in real time to match the user's requirements and enables users to achieve accurate control. The system includes a device for monitoring user activity and determining an appropriate device configuration from user activity sequences with that device, and a configurer that implements the appropriate configuration determined by the algorithm. The method further includes optional steps for identifying when a user with different configuration requirements starts to use a device, and for resetting the state of an inference algorithm when such changes are detected. This allows rapid configuration in environments where many individuals may use the same device.

24 Claims, 12 Drawing Sheets

OTHER PUBLICATIONS

S. Trewin, et al., "Keyboard and mouse errors due to motor disabilities", *International Journal of Human–Computer Studies*, vol. 50, pp 109–144, (1999).

S. Trewin, et al., "A model of keyboard configuration requirements", *Behaviour and Information Technology Special issue on Assistive Technologies for People with Disabilities*, vol. 18, No. 1, pp 27–35, (1999).

S. Trewin, et al., "Accellerating Assessment with Self-optimizing Devices", Proceedings of the 8th International conference on Computers Helping People with Special Needs, Linz, Austria, 3 pages, (Jul. 2002).

S. Trewin, "Input Errors by Keyboard and Mouse Users with Motor Disabilities", *Encyclopedia of Microcomputers*, vol. 27, Supp. 6, pp 163–177, (2001).

* cited by examiner

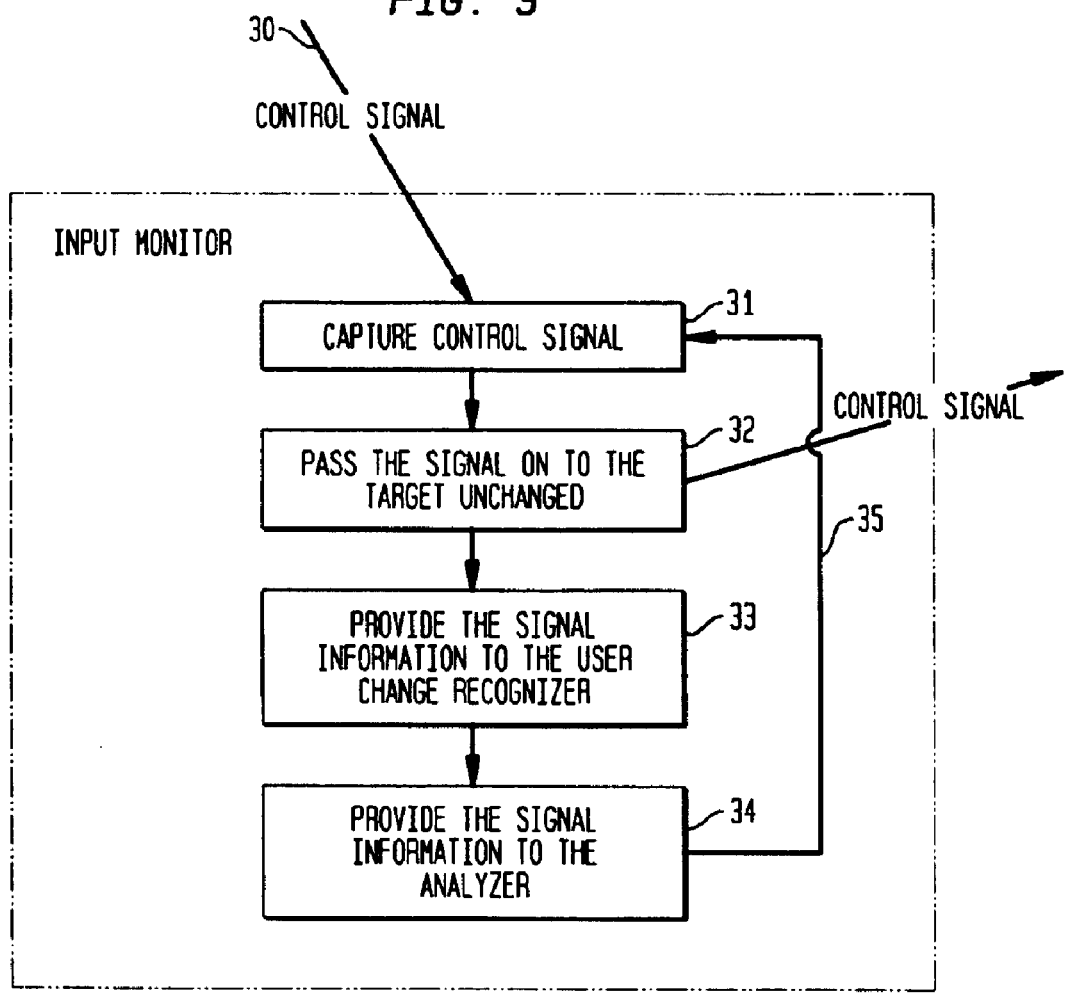

FIG. 13

|  |  | 1300 | 1301 |
|---|---|---|---|
| 1302 | Key repeat delay | 740 | milliseconds |
| 1303 | Key repeat rate | 50 | milliseconds |
| 1304 | Key acceptance delay | 0 | milliseconds |
| 1305 | Key debounce time | 70 | milliseconds |
| 1306 | Sticky Keys | -5 | (on) |

SYSTEM AND METHOD FOR AUTOMATIC CONTROL DEVICE PERSONALIZATION

CROSS-REFERENCE TO RELATED APPLICATIONS

The present invention is based upon and claims the benefit of the filing date of U.S. Provisional Patent Application Ser. No. 60/415,165 filed Sep. 30, 2002.

BACKGROUND OF THE INVENTION

1. Field of the Invention

The present invention relates generally to input devices used to control computer systems or other technology. More specifically, the present invention relates to the automatic, dynamic configuration of such devices in order to accommodate the control requirements of users who may have disabilities, or be operating the devices in contexts which affect their control of the device.

2. Description of the Prior Art

As the design of information technology systems and applications develops, more and more features allowing them to be configured to suit a range of user preferences and requirements are included. Computer control devices such as keyboards, mice, switches and touch pads are often accompanied by software which allows users to configure the device response to suit their physical abilities, situation and task. As disucussed in the reference to Trewin, S. and Pain, H. entitled "Keyboard and mouse errors due to motor disabilities," *International Journal of Human-Computer Studies* 50 (1999), pp. 109–144, appropriate configuration can be vital for computer users with physical disabilities, because the default mode of operation of the device may be unusable for them. For example, on a standard computer keyboard, a key that is held down will start to generate repeated characters after a certain time delay. A person with a disability which inhibits movement may find it difficult or impossible to raise their finger off the key before this delay is up. As a result, they will generate many unwanted repeated characters, making accurate typing impossible. Appropriate configuration of this delay value will eliminate unwanted key repeats, enabling accurate typing for this user.

The primary problem addressed by the present invention is that those individuals for whom configuration is most crucial are also those for whom it is most difficult to achieve independently. Previous approaches to device configuration have been manual, mediated by user-controlled tools, or assume a pre stored user profile and some form of user identification technique. All of these approaches have disadvantages. Manual configuration requires users to know how to perform configuration and to know what configuration they need. Both of these are often not the case, as indicated in the reference to Trewin, S. entitled "Configuration Agents, Control and Privacy," *Proceedings of the 1st ACM Conference on Universal Usability*, November 15–17, Washington D.C., USA, pp 9–16, ACM Press (2000). Users do not know what they can adjust, do not know what to adjust the settings to (e.g. what value of delay for the key repeats to use), and have difficulty controlling systems in order to make adjustments. Configuration tools such as Wizards (e.g., Microsoft Corporation's Accessibility Wizard) provide a mechanism for finding the available settings but still require users to choose their own settings, and to use the interface in order to configure it. These approaches lead to a catch-22 situation in which users must configure their systems in order to be able to use them, but need to use them in order to configure them. This effectively makes independent access impossible for users with more severe disabilities. Approaches based on a user profile, such as discussed in the reference to Stephanidis, C., Paramythis, A., Sfyrakis, M., Stergiou, A., Maou, N., Leventis, A., Paparoulis, G. and Karagiannidis, C. Entitled "Adaptable and adaptive user interfaces for disabled users in the AVANTI project," *Intelligence in Services and Networks: Technology for Ubiquitous Telecom Services. 5th International Conference on Intelligence in Services and Networks, IS & N 98 Proceedings* (1998), Springer-Verlag, 153–166, require the profile to be created in advance, which means using one of the manual or tool-based techniques, or having assistance. Furthermore, it also requires some standard way for the user to access their profile, or transfer it between machines, which may be physically or cognitively difficult to access. For example, users may forget ids and passwords, or forget to carry id badges, and may find it difficult to use schemes that require physical dexterity such as inserting cards in slots, or placing a steady finger on a fingerprint recognition surface.

A further aspect of input device configuration not addressed by these approaches is the dynamic nature of physical needs. While some user needs are permanent (e.g. amputee will always type with one hand and require an alternative way to generate multiple key presses such as Control-Alt-Delete), others may change over the short term (e.g. due to fatigue, or background noise) or long term (e.g. due to accident, healing, progression of disease, or the normal aging process). Existing configuration mechanisms do not accommodate the dynamic nature of users' requirements.

In support of this approach, it has been shown that it is possible to dynamically infer configuration requirements for the standard computer keyboard from the user's keystroke data. Such a showing is described in the reference to Trewin, S. entitled "Towards intelligent, adaptive input devices for users with physical disabilities," PhD Thesis, University of Edinburgh, Great Britain (1998) and in the reference to Trewin, S. and Pain, H. entitled "A model of keyboard configuration requirements," *Behaviour and Information Technology Special issue on Assistive Technologies for People with Disabilities* 18, 1 (1999), pp. 27–35. Similar techniques could be developed for other input devices such as the mouse, touch screen or head tracker.

The keyboard user modeling techniques described in these two references have been incorporated into a configuration tool called the "Keyboard Optimizer." This tool allows users to demonstrate their typing and provides them with suggestions for configuration modifications. Users then choose whether to try those settings, and can accept or reject them. Although the Keyboard Optimizer is easier to use and more accessible than other configuration mechanisms it does not completely solve the problems outlined above because users must still know that the program exists and be capable of launching it before they can benefit from its suggestions. Similarly, speech recognition programs such as IBM's Via Voice build user models from samples of user input. However, they require a user to go through a sequence of configuration tasks in order to create this user model, in this case a voice profile. This necessitates the use of some alternate control technique while the voice profile is being built, and so does not provide independent access for voice-only users.

In summary, in present day systems the process of configuration is entirely in the user's hands. Configuration facilities are not always used by those who would benefit from them due to problems with existing configuration mechanisms, specifically:

1) Lack of confidence in performing configuration;
2) Lack of knowledge of how to change the configuration;
3) Lack of awareness of the available options. In one study of keyboard configuration, only 35% of the 20 participants with disabilities had a computer teacher available. The remainder relied on themselves, friends, colleagues and family members for support.
4) Difficulty in identifying the appropriate solution to a problem. For example, it can be difficult for a user, or indeed an observer, to tell if two copies of a character appeared because they pressed the key for too long or accidentally pressed it twice. The solution to the former problem is to increase the key repeat delay—the time before a key starts to repeat when it is held down. Accidental double presses, on the other hand, require the use of the Bounce Keys configuration utility to introduce a debounce time. After a key is pressed, it will not register again until the debounce time has expired, thus preventing unintended additional key presses. In present day systems, users often choose configuration settings by a process of trial and error.
5) Lack of control over the unconfigured interface. For example, a user unfamiliar with a default system language may be unable to find out how to change the language themselves. A novice user with a disability affecting their use of the mouse may have difficulty in controlling the mouse well enough to find out about keyboard shortcuts, or to access the control panel in which they can adjust the mouse sensitivity.

Therefore, a need exists for providing a system and method for personalizing computer input in a manner so that computer control devices such as keyboards, pointing devices, switches, gesture interfaces and other type control device may be automatically configured in real time to match the user's requirements.

SUMMARY OF THE INVENTION

It is an object of the present invention to provide a system and methodology for enabling the automatic configuration of computer control devices such as keyboards, pointing devices, switches, gesture interfaces and like devices, in real time, to match a user's requirements.

According to an aspect of the present invention, there is provided a system and method for adjusting configurable parameters of a control device to improve the performance and control of the device according to needs of a user, the system comprising: an input monitoring mechanism, effective regardless of the user's current activity; a mechanism for analyzing the user's actions in real time and inferring appropriate configuration options for the user; and, a configurer, which sets the configuration options chosen by the analysis mechanism. The system may optionally implement a mechanism for identifying when a different user having different configuration needs starts to use the device.

As the user takes actions with the device, these actions are monitored by the input monitoring mechanism and passed to the identifying and analyzing modules. The analyzing module produces an assessment of the ideal configuration options for the device, and this is updated with every new user action on the device. When identifying module, if implemented, detects a change in user, it causes analyzing module to reinitialize. The recommendations made by the analyzing module are input to the configurer module, which implements them as closely as possible in the current operating environment.

Advantageously, the system and method is of particular benefit to people with disabilities that negatively impact their ability to control the device in its unconfigured state, novice users, and people whose configuration requirements change frequently.

BRIEF DESCRIPTION OF THE FIGURES

The objects, features and advantages of the present invention will become apparent to one skilled in the art, in view of the following detailed description taken in combination with the attached drawings, in which:

FIG. 3 depicts a flowchart detailing the method for capturing user actions with a device as a stream of control signals;

FIG. 4 illustrates a stream of control signals generated by a keyboard;

DETAILED DESCRIPTION OF THE PREFERRED EMBODIMENTS

A preferred embodiment of the invention consisting of a description of the method employed and the necessary apparatus will now be described.

Figure 1:
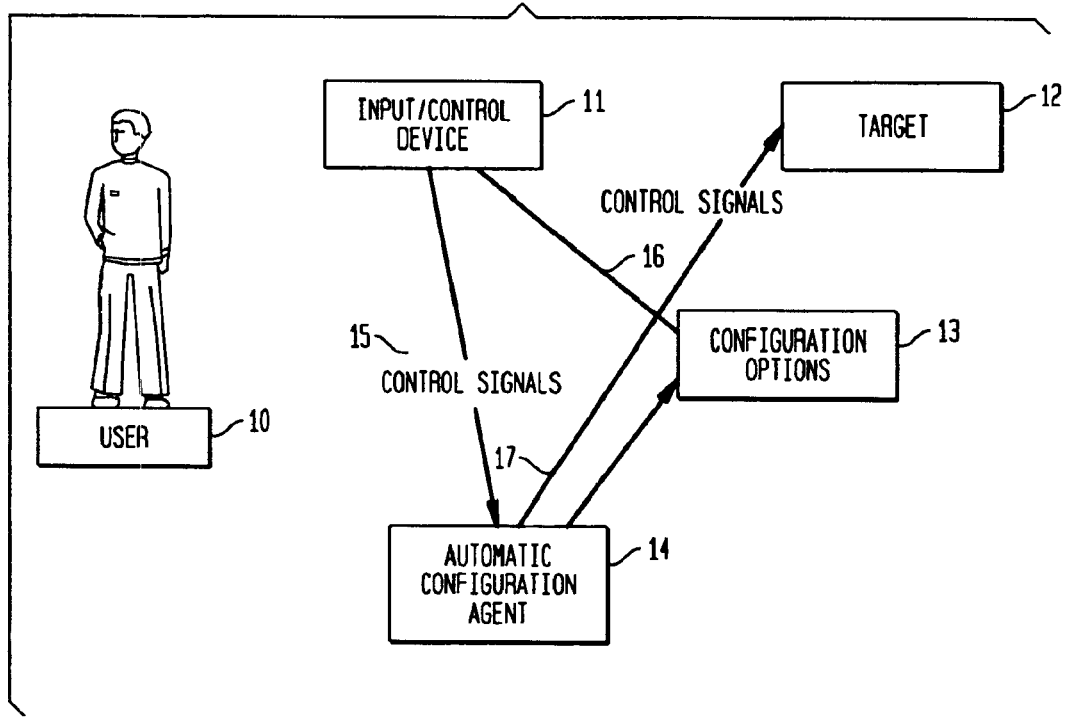
FIG. 1 illustrates an overall block diagram of a system providing for the automatic configuration of devices according to the present invention.

FIG. 1 depicts an overview of the present invention and particularly, illustrates the main actors involved in the configuration process for enabling a user to operate a control device in order to control a target, which may be an electronic device or service. As shown in FIG. 1, there is depicted a user (10) who may have a disability which affects motor control, speech or other function, or may be in a situation which affects their abilities in these areas (e.g., driving a car affects one's ability to operate a push button device). There is a control device (11) that the user wishes to operate. This device (11) may comprise a physical device such as a keyboard, mouse or binary switch, or it may be less tangible, such as speech input, which would be represented by a microphone and speech recognition software. The user wishes to use the control device in order to control a target device (12) which may comprise a personal computer, a household appliance (in which the input device may be physically built in to the target) or a service provided over the Internet via the user's device, for example accessing a currency conversion service through a cell phone. The input/control device (11) may be separate from or integrated with the target, and may include an integrated output mechanism such as a display. The input device (11) has a number of configuration options (13) associated with it that may be built into the device, the target, or both. Configuration options (13) for input/control devices include, but are not limited to: the delay before a key on a keyboard starts to repeat, the rate at which keys repeat, the volume of a microphone, the voice profile being used by a speech recognition package, the distance moved by a cursor on a computer screen for a given physical distance moved by a mouse, etc. These configuration options (13) are implemented in software and can be programmatically controlled. This control ability may be physically located at the device (11) or the target (12). The final actor is the automatic configuration agent (14) according to the preferred embodiment of the invention. This configuration agent (14) is connected to the output of the input/control device (11) for receiving control signals (15) therefrom, and, provides the control point (16) of the configuration options (13). Particularly, the configuration agent (14) reads the output signals (15) of the control device (11) but does not modify them. It passes the output as signals (17) on to the target (12) which processes the output signals (17) on the target in the way it would normally be handled.

As will be described in greater detail with respect to FIG. 4, the target receives the output signals (17) as control signals. As will be described with respect to FIGS. 2, 5 and 7, the configuration agent (14) analyses the user's control signals (15) and makes the appropriate (application program interface) API calls to adjust the configuration so as to optimize the configuration for the current user. For example, in the Microsoft Windows® operating system, the key repeat delay can be set to approximately 1 second by the Windows system call: SystemParametersInfo(SPI_SETKEYBOARDDELAY, 3, NULL, SPI_SENDCHANGE). Pointing devices and other keyboard configuration options may be controlled through the same function.

Figure 2:
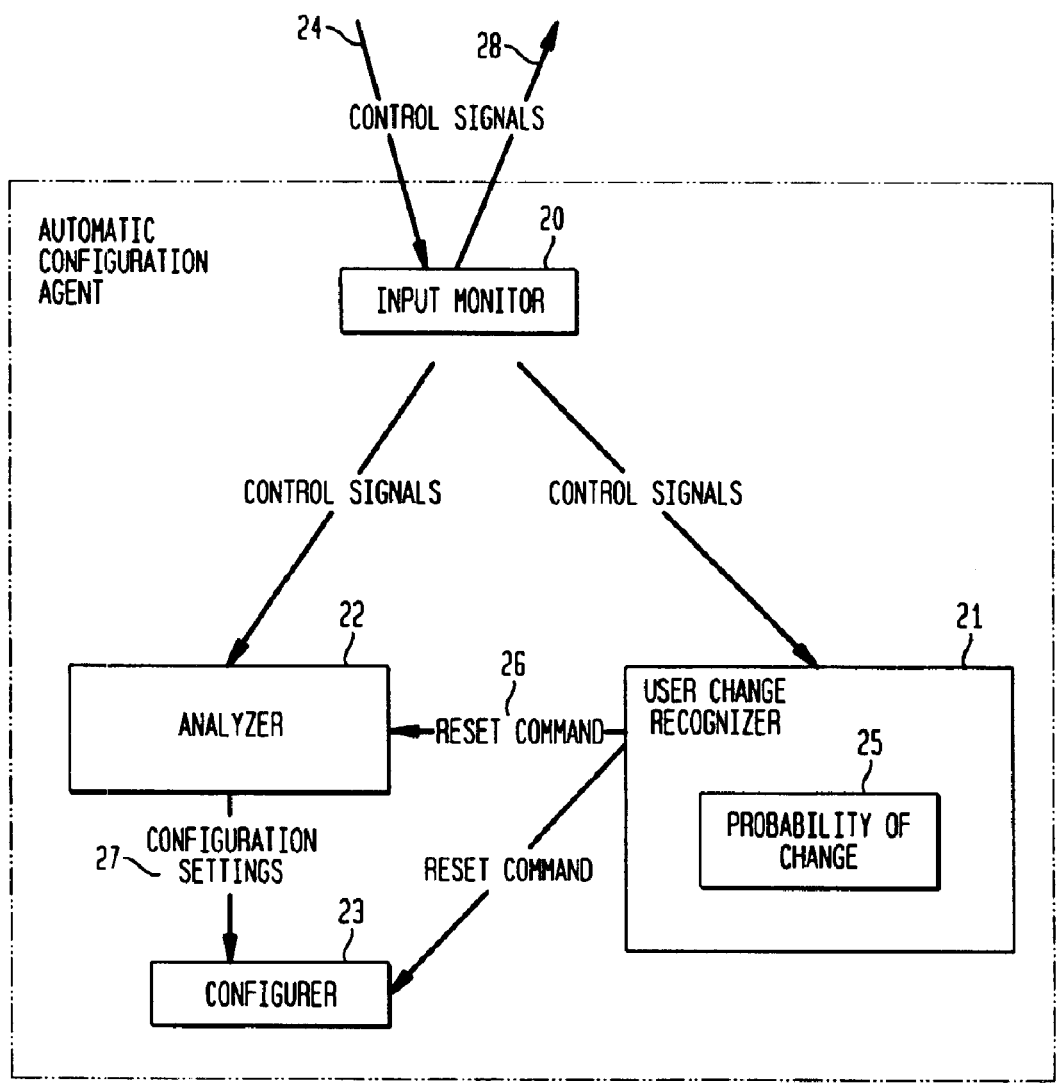
FIG. 2 illustrates the software architecture for an embodiment of the present invention and information flow between the components.

FIG. 2 illustrates a more detailed view of the automatic configuration agent (14) component of FIG. 1. As shown in FIG. 1, the automatic configuration agent (14) comprises: an input monitoring mechanism (20); a user change recognizer mechanism (21) for identifying when a different user starts to use the device; an analyzer mechanism (22) for analyzing the user's actions in real time and inferring appropriate configuration options for the user; and, a configurer component (23), which sets the configuration options chosen by the analysis mechanism. It should be understood that the method by which the configuration agent operates is specialized for a specific form of control device, and operates on a single device. Different instantiations of the method could be used to handle multiple control devices. A different instantiation of the method could omit the user change recognizer mechanism (21).

With more particularity, the input monitor component (20) captures user actions with the device as a stream of control signals (24). FIG. 4 illustrates example information comprising such a stream of signals. The input monitor component (20) copies this stream to both the analyzer (22) and the user change recognizer (21), and passes it on to the target (28). The user change recognizer (21) detects whether a new user with different configuration requirements to the previous user has recently started using the device, and may generate a probability value (25) ranging between 0.0 and 1.0 to indicate the probability of such a change. A value of 0 indicates that the same user, or a user with similar needs, is using the device. A value of 1 indicates that a very different user has taken over. Alternatively, as illustrated in the FIG. 2, the user change recognizer may directly send a reset command (26) to the analyzer (22) and configurer component (23) when a different user is detected. The analyzer (22) inspects the result of the user change recognizer. If the probability of a change in user (25) is above a given threshold (e.g., 0.75), then the analyzer performs a reset command (26). Regardless of whether a reset has occurred, the analyzer (22) produces a set of recommended configuration settings (27), and passes these to the configurer (23). As will be described in greater detail with respect to FIG. 13, a set of configuration recommendations for the keyboard may be provided. Some of these recommendations may be 'unknown', indicating that no recommendation is being made. After a reset operation, all recommended configuration values are 'unknown'. The configurer (23) communicates with the device or target in order to implement the recommended configuration settings.

FIG. 3 illustrates in greater detail the method for operation of the input monitor component (20). As shown in FIG. 3, the input monitor first waits for control signals (30) from the control device (11). When such a signal arrives, it captures the signal reported by the control device (31), sends the signal on to the appropriate receiver within the control device or target (32), provides a copy of the signal to the user change recognizer (33), if implemented; and provides a copy of the signal to the analyzer (34). It then processes the next control signal (35) by returning to capture step (31).

FIG. 4 illustrates an example stream of control signals generated by a control device, e.g., a keyboard device, with each successive signal represented as events (40,41,42,43). FIG. 4 specifically illustrates four events, with each event comprising attributes such as an event time (44), event type (45) and event data (46). First, at an example time 0012750 msec (44) a keyboard Shift key is depressed. An 'a' key is then pressed down (41). Next, the 'a' key is raised at time 0012795 (42) and the Shift key is raised at later time 0012810 (43). It is understood that the nature of control signals will be dictated by the form and modality of the control device.

Figure 5:
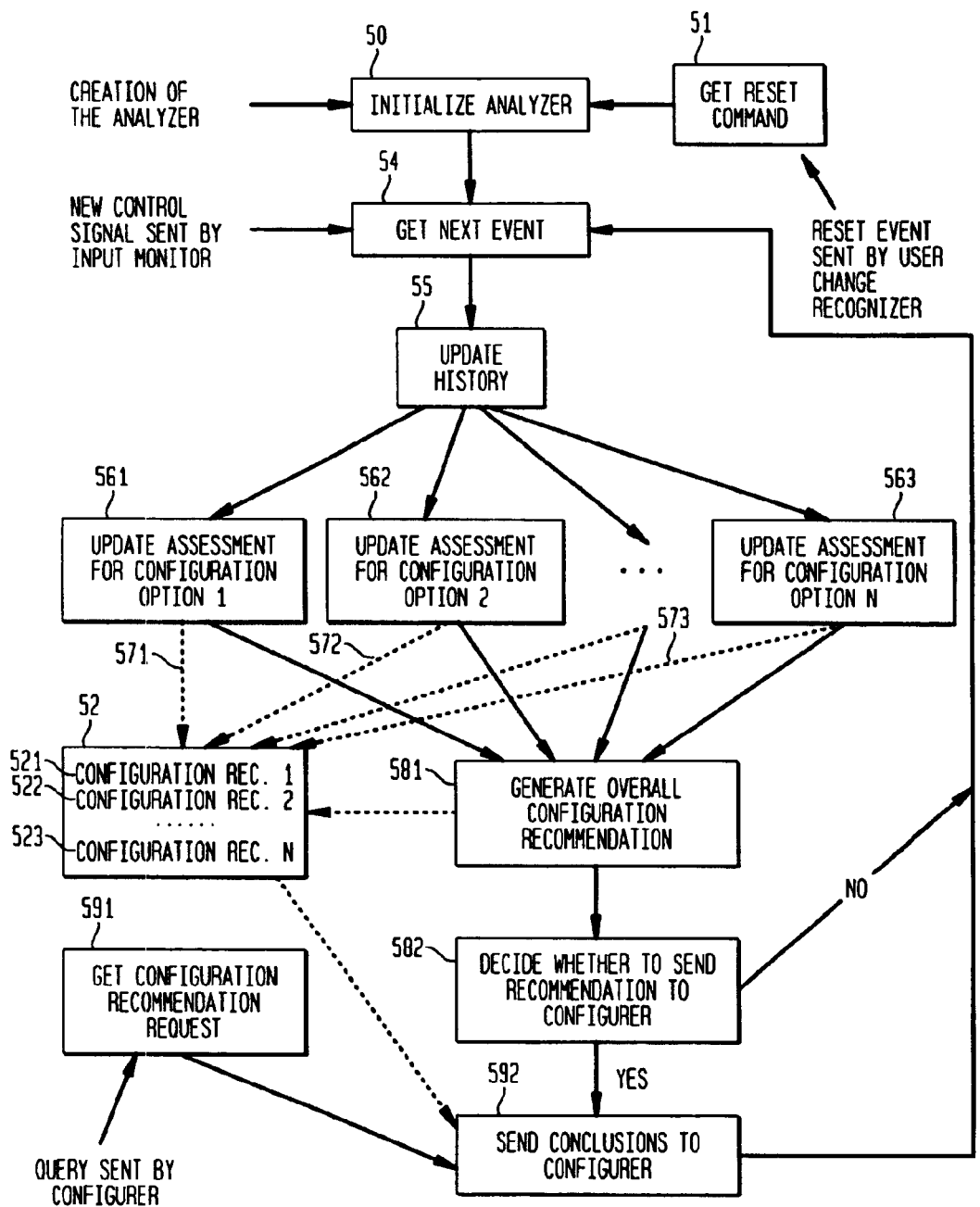
FIG. 5 is a flow chart illustrating a method for analyzing a user's actions and inferring appropriate configuration values.
Figure 10:
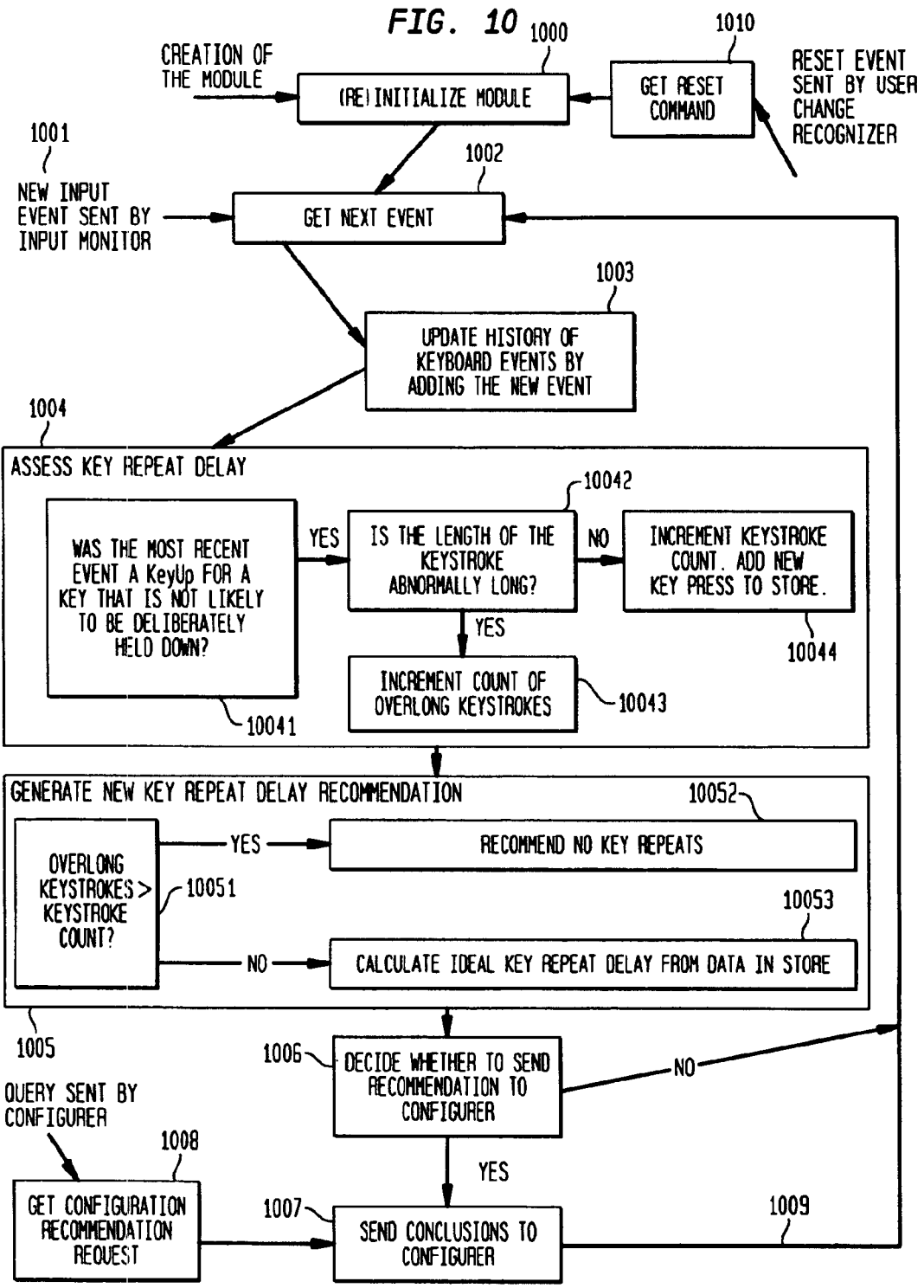
FIG. 10 is a flow chart illustrating an embodiment of the invention depicted in FIG. 5 for inferring an appropriate key repeat delay for a keyboard user

FIGS. 5 and 10 respectively illustrate a general method and specific embodiment of the technique for analyzing a user's actions and inferring appropriate configuration values in the analyzer component (22) of the automatic configuration agent (14) of FIG. 2. As shown in FIG. 5, on initialization (50), or in response to a reset (51), the user change recognizer sets its control signal history to be empty, and zeros any counts or ongoing analysis. It sets every value in the configuration recommendations (52) to 'unknown'. When a control signal (event) arrives (54) from the input monitor, it adds this to its event history (55). The event history includes an ordered list of all of the events since initialization or the last reset. The user change recognizer then provides this new history to individual modules (561–563) for each aspect of configuration under consideration. Each module (561–563) then examines the new history, analyses the control signals, and updates (571–573) a respective configuration recommendation, or set of recommendations (521–523) with which it deals. These recommendations are then combined to form an overall recommendation (581) and a decision is made (582) as to whether to actively pass this recommendation on to the configurer component (23) (FIG. 2). For example, the recommendation may be sent only when it is different to the previous recommendation, or different by a predetermined margin. If the recommendation is to be passed on, it is then sent to the configurer (592). The algorithm then processes, or waits for, the next event (54). In addition, at any time the configurer component may request information on the current recommendation (591). The analyzer handles such requests after it has processed an event (592) and responds by sending the full set of current recommendations. The analyzer handles reset commands (51) immediately upon receiving them. The above-indicated reference to Trewin, S. and Pain, H. entitled "A model of keyboard configuration requirements," *Behaviour and Information Technology Special issue on Assistive Technologies for People with Disabilities* 18, 1 (1999), pp. 27–35, provides a detailed description of the inference of keyboard configuration values and the whole contents and disclosure is incorporated by reference as if fully set forth herein.

Figure 6:
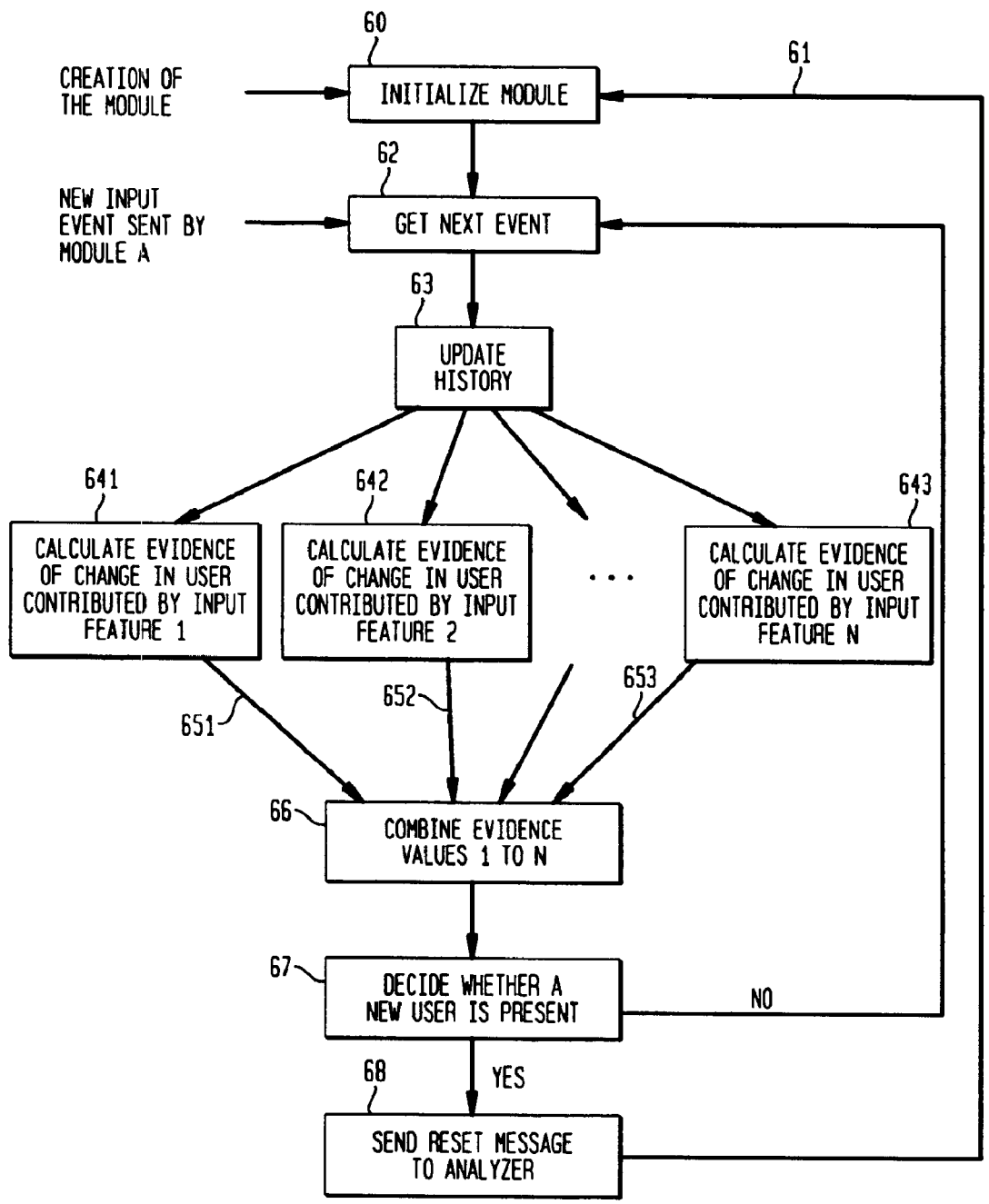
FIG. 6 is a flow chart illustrating a method for recognizing user changes.
Figure 11:
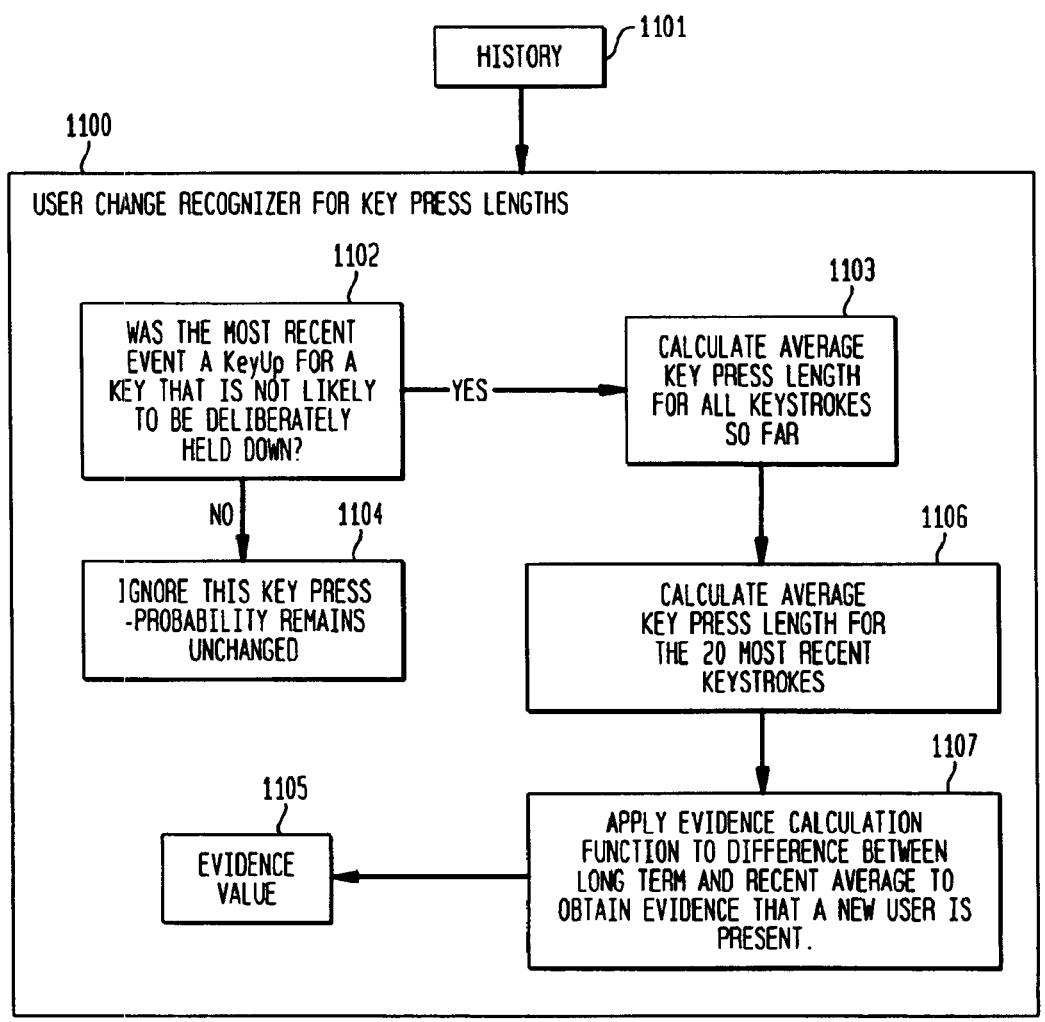
FIG. 11 is a flow chart illustrating an embodiment of the invention depicted in FIG. 6 for recognizing changes of user of a keyboard.

FIGS. 6 and 11 respectively illustrate a general method and specific embodiment of the technique for recognizing changes of user as implemented in the user change recognizer (21) of FIG. 2. As shown in FIG. 6, on initialization (60), or on reset (61), the user change recognizer sets its control signal history to be empty, and zeros any counts or ongoing analysis. It sets an "evidence" value to 0.5. When a control signal (event) arrives (62) from the input monitor, it adds this to its event history (63). The event history includes an ordered list of all of the events since initialization or the last reset. The user change recognizer then provides this new history to individual modules (641–643) for each feature of the input stream which contributes to the final assessment. Each of these modules (641–643) then calculates an independent probability of a different user being present (651–653), and those probabilities are combined (for example, using the well known Bayes Law formula) to produce a single evidence value (66). This value may be made directly available to the analyzer (22). As illustrated in FIG. 6, the user change recognizer also assesses the probability value (66) and decides whether a new user is present (67). If it is determined that a new user is present, it will send a reset message to the analyzer (68), and will itself reset (61), returning to state 60.

Figure 7:
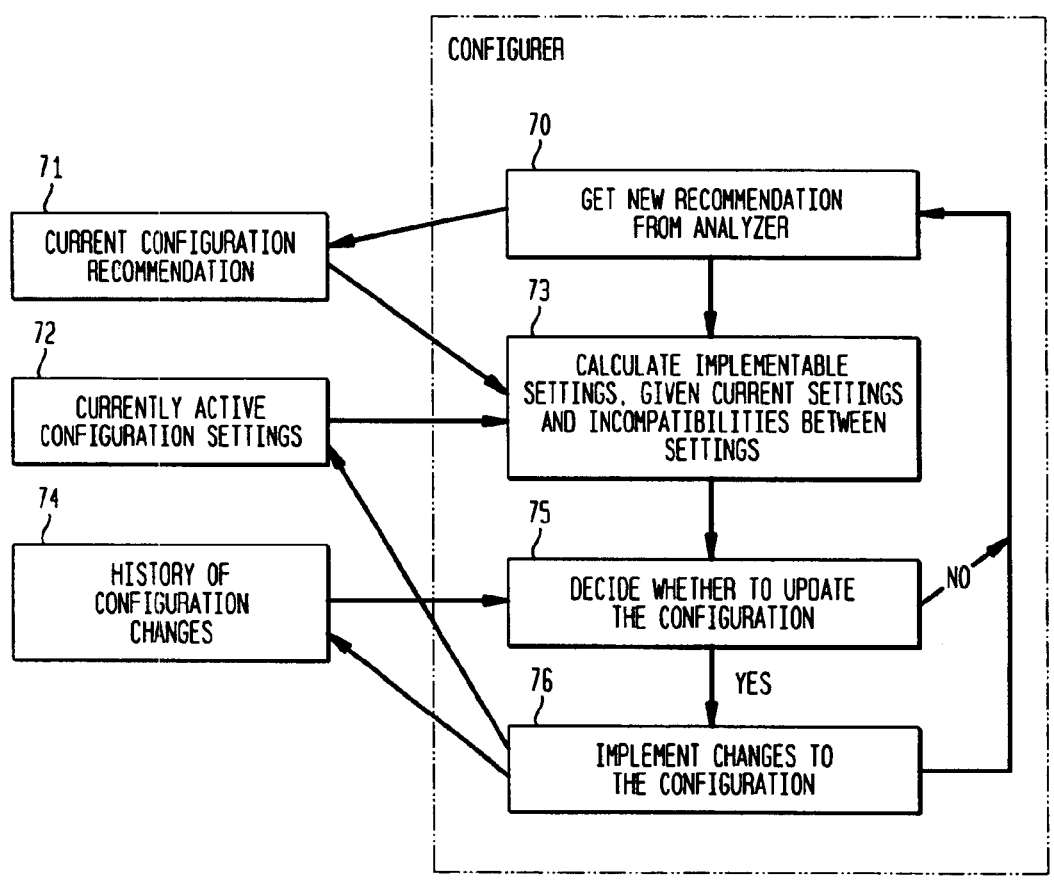
FIG. 7 is a flow chart illustrating a method for updating the active configuration.

FIG. 7 is a flow chart illustrating a method for implementing the configurer component (23) in the agent 14 if FIG. 2. As shown in FIG. 7, the configurer 70, first receives a configuration recommendation from the analyzer (22), either by requesting one, or by one being sent unsolicited. The configurer stores this as the current configuration recommendation (71). The configurer then queries the system for the currently active configuration settings (72). With this information, the configurer calculates which aspects of the recommendation may be implemented (73). This calculation is achieved by prioritizing configuration options and incorporating information about constraints and dependencies between options into the configurer. Configuration options are prioritized such that those most crucial to accessibility of the device have higher priority than others. This is measured by assessing the implications of having an inappropriate setting for a particular option, and the size of the user group who would potentially require that option. This prioritization is then used in situations in which two options cannot be simultaneously activated. For example, in the keyboard configuration options provided in the Microsoft Windows operating system, it is not possible to have both a non-zero key acceptance delay and a non-zero debounce time activated. That is, an acceptance delay is the duration of time a key must be held down for before it will register. The usual value is zero, meaning keys register immediately. People who often accidentally bump keys may benefit from a non-zero key acceptance delay. A debounce time, on the other hand, is a period of time which starts after a key is raised. During that time, the same key will not register if pressed again. This is useful for people with tremor that causes them to press keys multiple times. These options are therefore prioritized, so that if a recommendation for a debounce time and an acceptance delay is made, a decision as to which to implement can be made. Similarly, if the existing system settings include values incompatible with the recommendations, the configurer gives priority to the settings already in force on the system. Once the options to be activated have been chosen, specific values for those options are chosen. The analyzer (22) may provide a recommendation which does not take into account the available values which may be implemented on the underlying system. For example, a debounce time of 175 msec may be recommended, while the underlying system may recognize only values of 0, 300, 500 and 700 msec. The recommended value is rounded up to the next highest available setting. In this case 300 msec. In this manner, the configurer adjusts the recommended configuration to one that is implementable on the underlying system and compatible with the current settings. As further shown in FIG. 7, the next step (75) is to decide whether the configuration should be updated. This decision is made with reference to a history of configuration changes (74) which records the time, position in the event stream and nature of all changes made to the configuration in the current session. If the configuration has been changed recently, and if the change was directly opposed to the current change, in other words the proposed change reverses a recent change, then no change is made. If the proposed change is novel, if it reinforces a previous change, or if there is no recent change, then the decision made is to update the configuration of the system. This mechanism provides for stability by inhibiting the 'thrashing' effect in which a system repeatedly switches back and forth between two settings. In one embodiment, a threshold value constituting a "recent" change may be 5 minutes or 100 key events (i.e. 50 key presses). Finally, in FIG. 7, if the decision to update the configuration is made, the configurer calls the appropriate system functions to set the recommended parameters (76). This may involve one or more function calls as will be described in further detail herein with respect to FIG. 12.

Figure 8:
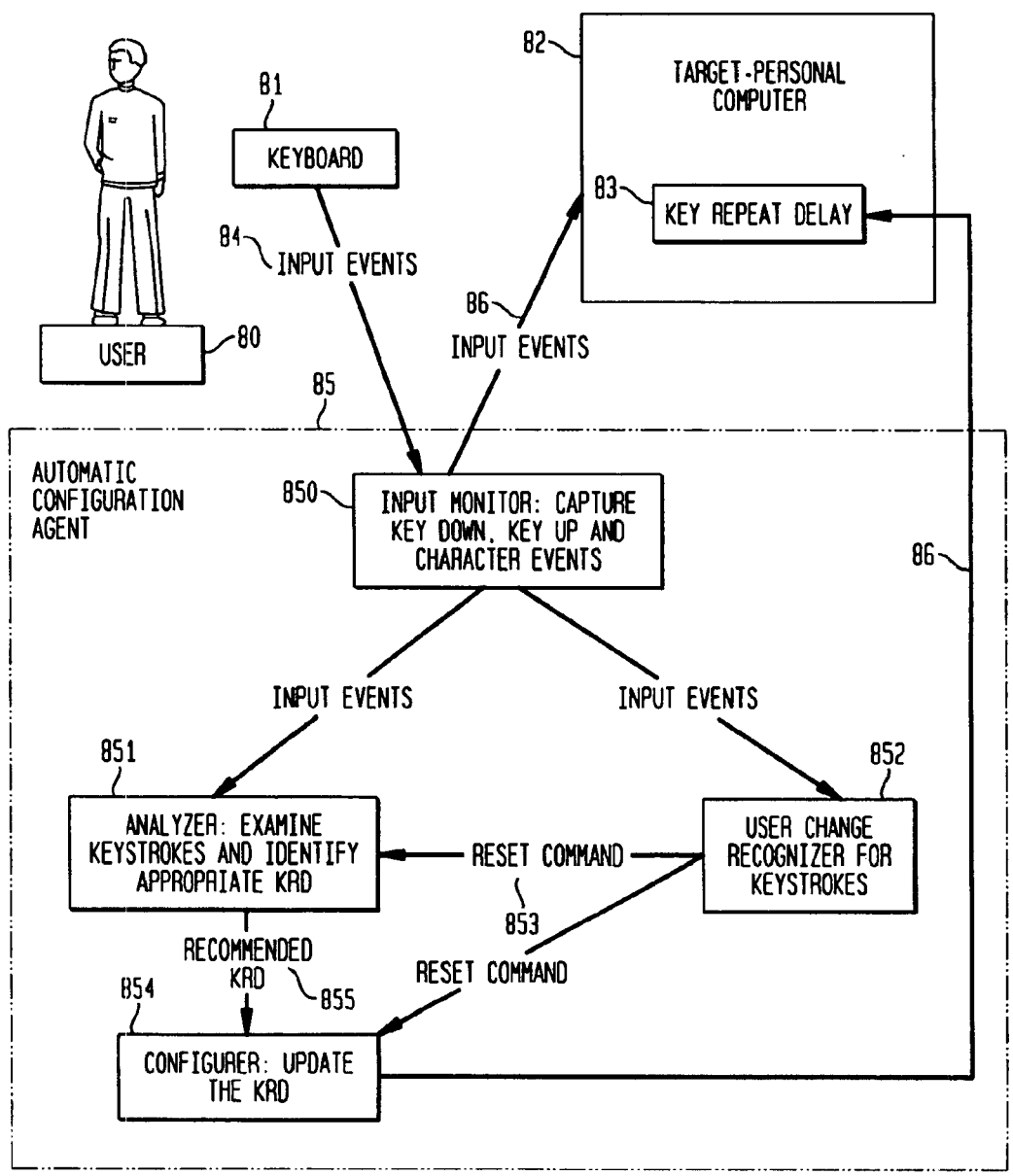
FIG. 8 depicts the software architecture according to an embodiment of the invention depicted in FIG. 2, for configuring the key repeat delay of a keyboard device.

FIG. 8 is diagram depicting the software architecture for implementing the configuration agent methodology described with respect to FIG. 2, for an example embodiment of configuring a key repeat delay function of a keyboard. As shown in FIG. 8, a user (80) is using a keyboard (81) as a control device to control a personal computer system (82) as the target. The delay before keys start to repeat (key repeat delay—KRD) may be configured via software (83) provided by the operating system of the personal computer. As the user presses keys on the keyboard, these actions generate key down and key up events (84) which are passed to the operating system of the personal computer. In this embodiment, the automatic configuration agent is a software program (85) residing on the personal computer. Input events (84, 86) are viewed by the automatic configuration agent during the course of their processing within the target and are not changed by the automatic configuration agent. Within the agent, the events are processed by an input monitor (850), the operation of which is described in greater detail herein with respect to FIG. 9. The monitor (850) passes these events to both the analyzer (851) and the user change recognizer (852). The analyzer uses the events to calculate an appropriate key repeat delay (KRD) for the keyboard, and will be described in greater detail herein with respect to FIG. 10. The user change recognizer (852) uses these events to identify places in the input stream where a different user begins to operate the computer, as will be described in greater detail herein with respect to FIG. 11. When the user change recognizer identifies a change in user it sends a reset command (853) to the analyzer. The analyzer responds by restarting its calculations. The analyzer passes details of the recommended KRD (855) to the configurer (854) whenever the recommendation changes. The configurer (854) adjusts the recommendation to match the key repeat delay options available on the personal computer, then compares the recommended KRD with the currently active KRD. If the recommended KRD is different, then the current KRD on the personal computer is updated to match the recommendation (86). Further details regarding the configurer functionality will be described in greater detail herein with respect to FIG. 12.

Figure 9:
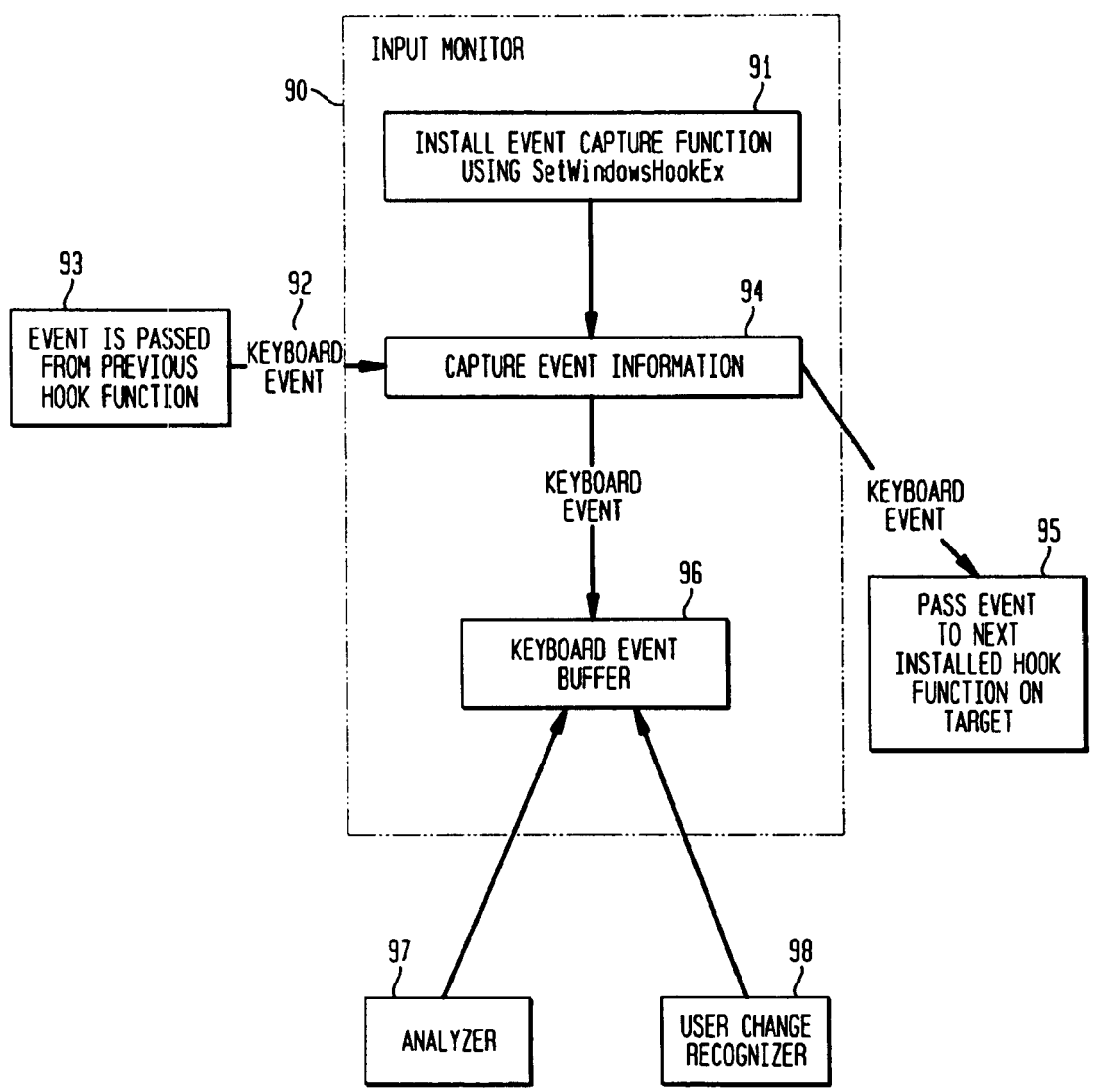
FIG. 9 is a flow chart depicting an embodiment of the invention illustrated in FIG. 3 for capturing keyboard control signals.

FIG. 9 is diagram depicting the software architecture for implementing the input monitor (90) methodology described with respect to FIG. 3 for capturing keyboard control signals. In the example embodiment, the target is a personal computer running the Microsoft Windows operating system. Particularly, the MS Windows operating system enables a program to be activated via a keyboard event by installing a system hook (91) (calling the application program interface (API) function SetWindowsHookEx) which gives access to all the keyboard events (i.e., keyboard control signals) (92) as they are reported from the keyboard within the operating system (93). The system hook captures the event information (94), reads the events and passes them on to the next hook function (95). The system hook additionally copies the information to a memory address or buffer (96) which is read by the analyzer (97) and user change recognizer (98). This information includes the time of the event, the nature of the event (e.g. key up, key down) and other information such as which key was pressed, as illustrated in the example embodiment of control signals (keyboard events) as depicted FIG. 4.

FIG. 10 is diagram depicting the software architecture for implementing the analyzer methodology described with respect to FIG. 5 for inferring an appropriate key repeat delay for a keyboard user. Upon initialization (1000), an empty history is created and a store of key press lengths is created. A count of overlong keystrokes and a count of normal keystrokes are set to zero. The initial key repeat delay recommendation is 'unknown'. When an input event (1001) is available, step (1002) accesses this event by retrieving it from the keyboard event buffer (96) of FIG. 9. In step 1003 it is added to the history. Following this, in step 1004, the new history is used to assess the key repeat delay, then in step 1005 a new recommendation for the repeat delay is generated. In step 1006, a decision is made as to whether to forward this recommendation to the configurer. By way of example, an analyzer may decide to forward the key repeat delay recommendation only when it is more than 50 milliseconds different from the previous recommendation sent. If the recommendation is to be sent, processing passes to step 1007, otherwise processing returns to step 1002 to fetch the next event. In step 1007, the recommendation is sent to the configurer which component may also request a recommendation (1008) at any time. When such a request is received, the analyzer finishes processing the current keystroke then responds to the request by sending the recommendation in step 1007. After sending a recommendation, the analyzer returns to step 1002 to fetch the next event (1009). As further shown in FIG. 10, the analyzer may receive a reset event at any time (1010). When a reset event is received, the event is immediately processed and the analyzer returns to step 1000 for reinitialization.

With more particularity, the step 1004 for assessing a received key repeat delay event is now further described with respect to FIG. 10. In a first step 10041, a determination is made as to the nature of the most recent event. For example, if the new received event is a key up event (a key being released), and the key being released is one which is unlikely to be deliberately held down, then processing proceeds to step 10042. Otherwise, processing continues to step 1005. Determination of whether a key is likely to be deliberately held down will be described in greater detail herein with respect to FIG. 11. At step 10042, a comparison is made to determine whether the length of the most recent keystroke exceeds a threshold value. If it is over the threshold, processing passes to step 10043, where a counter of overlong keystrokes is incremented and maintained. Otherwise, if the length of the most recent keystroke does not exceed a threshold value, processing passes to step 10044 where the normal keystroke count is incremented, and the key press length is added to the store.

With more particularity, the step 1005 of FIG. 10 for generating a new key repeat delay recommendation is now further described with respect to FIG. 10. In a first step 10051, the overlong keystroke count is compared with the count of normal keystrokes. If there are more overlong keystrokes than normal keystrokes, processing passes to step 10052, where a recommendation of 'off' is made (i.e., no key repeats). Otherwise, if the count of overlong keystrokes does no exceed the normal keystroke count, processing passes to step 10053 where a key repeat delay is calculated from the data in the store. By way of example, this calculation may return the average length of key presses plus some constant. As a second example, it may also return the length of the longest key press. It should be understood that many other algorithms are possible for implementing the step of generating a new key repeat delay recommendation. Further examples include algorithms based only on recent keystrokes, algorithms that choose a value greater than a specific percentage of recorded keystroke lengths, and algorithms that use Bayesian networks or fuzzy logic to calculate the most probable ideal setting.

FIG. 11 is diagram depicting the software architecture for implementing the user change recognizer methodology described with respect to FIG. 6 for recognizing a change of user based on key press lengths for a keyboard user. More particularly, FIG. 11 illustrates an embodiment of the method depicted in blocks (641–643) of FIG. 6 for recognizing instances of a change of keyboard user. The methodology (1100) described in the example embodiment depicted in FIG. 11, is based on a specific feature of the input stream: key press lengths. On initialization, the current evidence value (1105) is initialized. For example, a value of 0.5 may be used, indicating that there is no strong evidence as to whether the user has recently changed. The method (1100) is passed a history of recent keyboard events (1101) as described in FIG. 6. First, in step 1102, the recognizer module examines the most recent event in the history. If this was a key up event (a key being released), and the key being released is one which is unlikely to be deliberately held down, then processing proceeds to step 1103. Otherwise, processing stops (1104) and the probability (1105) of a different user being present remains unchanged. The likelihood of a key being deliberately held down may be obtained by considering the purpose of the key. Alphanumeric keys are not typically held down, while modifier keys, arrow keys and editing keys such as delete and backspace are often held down. For safety, processing is limited to the number and letter keys. Punctuation may sometimes be repeated (e.g. holding down the dash to create a separating line in a document) and so for the purposes of this algorithm punctuation is treated the same way as navigation and editing keys. In step 1103, the key press length (keyUpTime minus keyDownTime) of the most recent keystroke is contributed to the average key press length for all keystrokes examined so far in this step. Continuing to step 1106, the same calculation is performed for a number of the most recent of these keystrokes. In the embodiment depicted in FIG. 11, this number may be twenty (20) of the most recent keystrokes. In step 1107, the two values obtained in steps 1103 and 1106 are compared, and the difference between these values forms the basis of the calculation for updating the evidence value (1105). For example, the evidence value could be updated by the following algorithm:

if (difference(recentAverage, longTermAverage)>threshold) then evidence=1; else evidence=0;

In the herein incorporated reference to Trewin, S. and Pain, H. entitled "A model of keyboard configuration requirements," *Behaviour and Information Technology Special issue on Assistive Technologies for People with Disabilities* 18, 1 (1999), pp. 27–35, a threshold value of 50 milliseconds was found to be effective. When the evidence value (1105) exceeds a threshold (e.g. 0.75), reset commands are sent to the analyzer (851) and configurer (854), as described herein.

Figure 12:
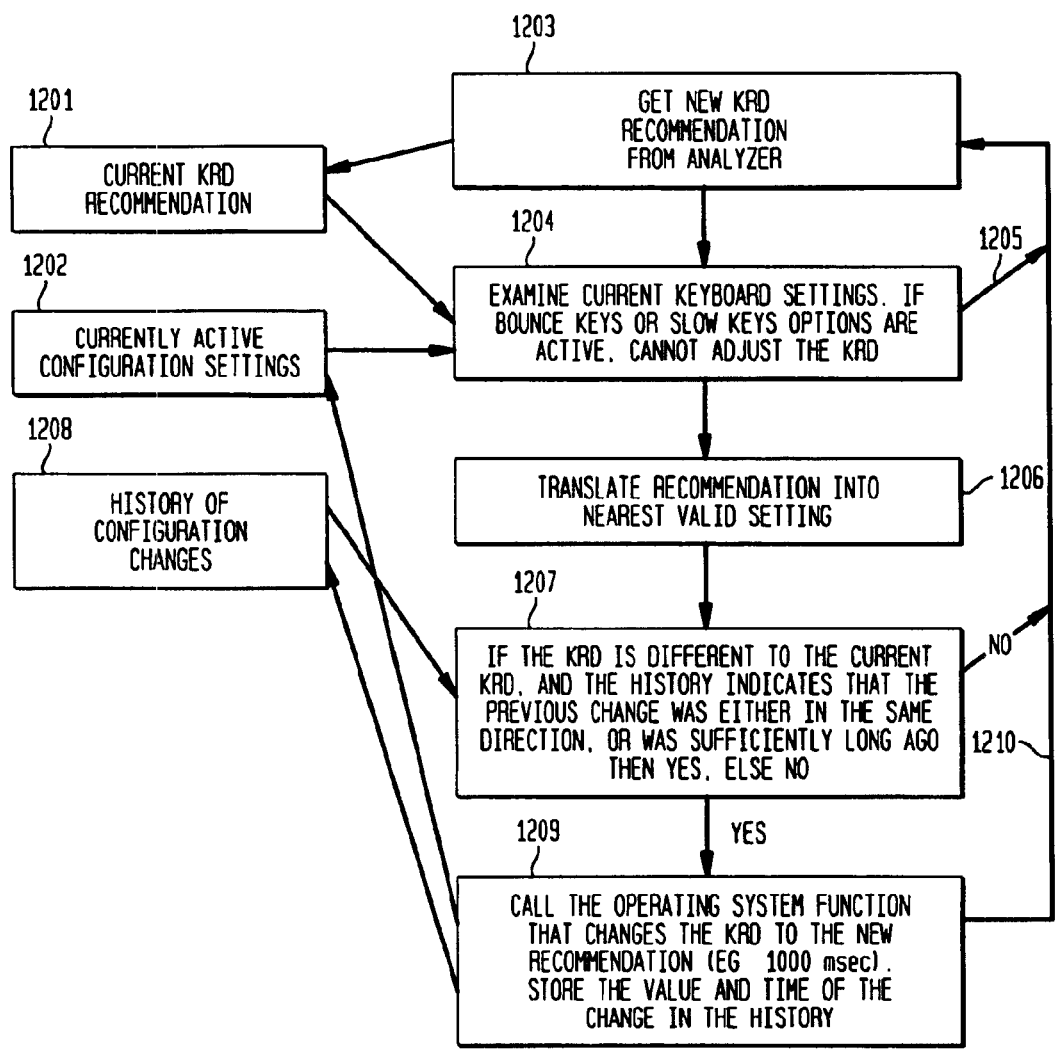
FIG. 12 is a flow chart illustrating an embodiment of the invention depicted in FIG. 7 for setting the key repeat delay of a keyboard; and, FIG. 13 illustrates a set of configuration recommendations for a standard keyboard.

FIG. 12 is diagram depicting the software architecture for implementing the configurer component methodology described with respect to FIG. 7 for updating the active key repeat delay for a keyboard user. More particularly, FIG. 12 illustrates an embodiment of the method depicted in FIG. 7 for setting the key repeat delay of a keyboard. The configurer receives a key repeat delay recommendation from the analyzer component of the configuration agent in step 1203 and stores it as the current KRD recommendation (1201). This may either be for example, a positive millisecond value or a negative value 'off' indicating that key repeats are to be suppressed. The configurer then finds the currently active keyboard configuration (1202). On the MS Windows® operating system this can be achieved by calling the windows API function SystemParametersInfo three times, requesting information for the keyboard delay, keyboard speed, and values of the filterKeys structure, which includes other keyboard configuration options oriented towards people with motor disabilities, as illustrated in and described with respect to FIG. 13. In step 1204, the configurer examines the current keyboard settings (1202). If any active settings are incompatible with the proposed KRD value, the existing settings take priority and the active configuration is not changed (1205). More specifically, if specialized keyboard accessibility features, specifically the debounce time and the key acceptance delay, are non-zero, then the key repeat delay cannot be adjusted because it is incompatible with those settings. Similarly, if several recommendations were made, the configurer would prioritize these in order to handle incompatibilities that may exist. If the KRD can be adjusted, the configurer proceeds to step 1206, in which it transforms the recommended value to the nearest greater value that is implementable in the current system. The set of legal values is built into the configurer, which is specific to the personal computer operating system on which it is running. Next, at step 1207, the configurer examines the recent history (1208) of changes to the KRD. This history indicates the time in milliseconds, the input event count, and the value set for the KRD since the last reset, or since the start of the session. The history is used in step 1207 to decide whether the KRD should be adjusted. Adjustments are recorded so as to avoid the situation where the settings are repeatedly toggled between two values. If the recommended adjustment is an increase in KRD, and the previous adjustment was also an increase, or if both were decreases, then the change is made. If the previous change was opposite to the current recommendation then the time and event count of the change are examined. The system will only be updated if the previous change was sufficiently long ago. 'long ago' is defined by a threshold value time which may be adjusted to suit the situation. If the system is to be updated, the configurer proceeds to step 1209. It calls the functions necessary to update the KRD on the target system. On the Windows® operating system, there are two functions which control the key repeat delay. Both are adjusted by calling the SystemParametersInfo system function. One call refers to the SPI_SETKEYBOARDSPEED option, while the other refers to the SPI_SETFILTERKEYS option. The appropriate function to call depends on the current state of the FilterKeys Windows data structure. If the FilterKeys structure indicates that it is active, then the SPI_SETFILTERKEYS option must be used to control the KRD. If FilterKeys is not active, the appropriate function call depends on the value to be implemented, as the two functions have different ranges of values. If the SPI_SETFILTERKEYS option is chosen, the other values in the structure must be set so as not to activate any of the additional FilterKeys features. In step 1209, if these calls are successful, the value, time and event count are stored in the history (1208). The configurer then returns (1210) to step 1203 and waits for a new recommendation from the analyzer.

FIG. 13 illustrates an example set of configuration recommendations (1302, 1303, 1304, 1305, 1306) for a standard keyboard. Five configuration parameters are shown, each on a separate line with each parameter having attributes such as a name (1300), and a value (1301). Configuration values 1302, 1303 1304 and 1305 thus comprise integers representing, for example, a millisecond value. One parameter, the sicky key parameter (1306) is also an integer, type, for example, a negative integer –5. This is one of a set of special values which includes 'On', 'Off', and 'Unknown' and all have negative values. A positive value for a parameter indicates a specific setting, however, for some parameters, only a negative value is valid. For other parameters, both positive and negative values are permitted. The parameters in the example embodiment depicted in FIG. 13 are:

Key Repeat Delay (1302): is the period of time after the key down event when the first repeat character will be generated. On the Windows® operating system, the values 250, 300, 500, 700, 750, 1000, 1500, 2000 and Off are valid. Off means that keys do not repeat;

Key Repeat Rate (1303): is the period of time after a repeated character is generated when the next one will be generated. A set of 31 legal values are provided by the Windows® operating system;

Key Acceptance Delay (1304): is the period of time after a key is pressed down before the character will be generated. If the key is raised during this time, no character is generated. Normally, the key acceptance delay is zero and characters are generated at the same time as the key down event;

Key Debounce Time (1305): is the period of time after a key has been raised during which the same key will not generate characters if pressed down again. Normally, the debounce time is 0 and keys may be pressed again immediately after being raised.

Sticky Keys (1306): is a facility that may be on or off. When it is on, modifier keys (shift, control and alt) become 'sticky'. That is, when one of these keys is pressed and released, it remains active until the next key has been released. So a capital letter can be generated by pressing and releasing shift, then pressing the letter to be capitalized. Normally Sticky Keys is off and capital letters must be generated by holding down the Shift key while pressing the letter to be capitalized.

Although the foregoing invention has been described in some detail for the purposes of clarity and understanding, it will be apparent that certain changes and modifications may be practiced within the scope of the appended claims. For instance, the present invention is applicable to any control device that can be configured via software, and not necessarily one composed of physical buttons. Also, the target being controlled may take many forms and include a variety of purposes including home appliances, personal computers, mobile information appliances, and Internet-based services. Therefore, the described embodiments should be taken as illustrative and not restrictive, and the invention should not be limited to the details given herein but should be defined by the following claims and their full scope of equivalents.

What is claimed is:

1. A system for adjusting configurable parameters of a control device to improve the performance and control of said device according to needs of a user, said system comprising:

means for monitoring control signals comprising a stream of events representing activities a user may undertake at a target device generated through use of a control device by said user, said monitoring means capturing the control signals reported by the control device in real time such that a timing of each event is preserved, and forwarding them to said target device in a form as intended to be received by said target device;

means for analyzing captured user control signals to yield a proposed optimal set of configuration parameters for the user who generated said control signals; and means for adjusting a current configuration of the control device to match the proposed optimal set of configuration parameters, wherein said monitoring is imperceptoble tp a iser of said control device.

2. The system as claimed in claim 1, further comprising means for identifying when a user of said control device having different configuration needs begins to generate control signals with said device, said means receiving said event stream reported by said control device, processing said events and generating a value indicating a probability that recent control signals have been generated by a user with different configuration requirements than an immediately prior user.

3. The system as claimed in claim 2, further including means for resetting said system such that all prior proposed values representing potential configuration options and accumulated data from data structures storing said proposed values, are reset to enable a new analysis to commence.

4. The system as claimed in claim 1, wherein said means for analyzing said control signals comprises means for processing said events receiving from said event stream reported by said control device, and generating one or more proposed values representing potential configuration options available on said control device.

5. The system as claimed in claim 4, further including means for optionally receiving as additional input control device configuration values in force at each point in a stream of control signals.

6. The system as claimed in claim 4, further including means for identifying patterns in the captured event stream that are indicative of specific configuration requirements.

7. The system as claimed in claim 6, further including means for utilizing identified patterns in the captured event stream that are indicative of specific configuration requirements, and producing specific configuration recommendations addressing the identified requirements.

8. The system as claimed in claim 4, wherein said control device is a keyboard and said event stream comprises signals representing up/down key stroke events, said system generating one or more proposed values for configuration options available to said keyboard device intended to maximize the accuracy and/or throughput the user can achieve with said device.

9. The system as claimed in claim 4, wherein said means for analyzing user control signals to yield a proposed optimal set of configuration parameters operates in real-time to dynamically update its output according to ongoing analysis of said stream of control signals being reported by said control device.

10. The system as claimed in claim 1, wherein said means for adjusting said configuration of the control device receives as input a partial or complete set of configuration option values for said control device and manipulates the configuration of said control device such that the active configuration of said control device matches as closely as possible the configuration values provided as input.

11. A method for adjusting configurable parameters of a control device to improve the performance and control of said device according to needs of a user, said method comprising the steps of:

a) monitoring control signals comprising a stream of events representing activities a user may undertake at a target device generated through use of a control device by said user, b) capturing the control signals reported by the control device in real time such that a timing of each event is preserved, and forwarding them to said target device in a form as intended to be received by said target device;

c) analyzing user control signals to yield a proposed optimal set of configuration parameters for the user who generated said control signals; and d) adjusting a current configuration of the control device to match the proposed optimal set of configuration parameters, wherein said step of monitoring is imperceptible to a user of said control device.

12. The method as claimed in claim 11, further including the steps of:

identifying when a user having different configuration needs begins to generate control signals with said device, said step of identifying further comprising:

processing said events receiving from said event stream reported by said control device; and generating a value indicating a probability that recent control signals have been generated by a user with different configuration requirements than an immediately prior user.

13. The method as claimed in claim 12, whereupon identification of a new user having different configuration needs, a step of resetting all prior proposed values representing potential configuration options and accumulated data from data structures storing said proposed values to enable a new analysis to commence.

14. The method as claimed in claim 11, wherein said analyzing step further comprises the step of:

processing said events receiving from said event stream reported by said control device; and generating one or more proposed values representing potential configuration options available on said control device.

15. The method as claimed in claim 14, further including a step of optionally receiving as additional input control device configuration values in force at each point in a stream of control signals.

16. The method as claimed in claim 14, further including a step of identifying patterns in the captured event stream that are indicative of specific configuration requirements.

17. The method as claimed in claim 16, further including the steps of:

utilizing identified patterns in the captured event stream that are indicative of specific configuration requirements; and producing specific configuration recommendations addressing the identified requirements.

18. The method as claimed in claim 14, wherein said control device is a keyboard and said event stream comprises signals representing up/down key stroke events, said method generating one or more proposed values for configuration options available to said keyboard device intended to maximize the accuracy and/or throughput the user can achieve with said device.

19. The method as claimed in claim 14, wherein said step of analyzing user control signals to yield a proposed optimal set of configuration parameters operates in real-time, said analyzing including dynamically updating its output according to ongoing analysis of said stream of control signals being reported by said control device.

20. The method as claimed in claim 11, wherein said adjusting step includes the step of:

providing as input to the control device, a partial or complete set of configuration option values for said control device; and, manipulating the configuration of said control device such that the active configuration of said control device matches as closely as possible the configuration values provided.

21. A computer program device readable by a machine, tangibly embodying a program of instructions executable by a machine to perform method steps for adjusting configurable parameters of a control device to improve the performance and control of said device according to needs of a user, said method comprising the steps of:

a) monitoring control signals comprising a stream of events representing possible activities a user may undertake at a target device generated through use of a control device by said user;

b) capturing the control signals reported by the control device in real time such that a timing of each event is preserved, and forwarding them to said target device in a form as intended to be received by said target device;

c) analyzing user control signals to yield a proposed optimal set of configuration parameters for the user who generated said control signals; and d) adjusting a current configuration of the control device to match the proposed optimal set of configuration parameters, wherein said step of monitoring is imperceptible to a user of said control device.

22. The computer program device readable by a machine as claimed in claim 21, wherein said method further includes the step of:

identifying when a user having different configuration needs begins to generate control signals with said device, said step of identifying further comprising:

processing said events receiving from said event stream reported by said control device; and generating a value indicating a probability that recent control signals have been generated by a user with different configuration requirements than an immediately prior user.

23. The computer program device readable by a machine as claimed in claim 22, whereupon identification of a new user having different configuration needs, a step of resetting all prior proposed values representing potential configuration options and accumulated data from data structures storing said proposed values to enable a new analysis to commence.

24. The computer program device readable by a machine as claimed in claim 21, wherein said analyzing step further comprises the step of:

processing said events receiving from said event stream reported by said control device; and generating one or more proposed values representing potential configuration options available on said control device.

* * * * *

UNITED STATES PATENT AND TRADEMARK OFFICE
CERTIFICATE OF CORRECTION

PATENT NO. : 6,948,136 B2
DATED : September 20, 2005
INVENTOR(S) : Sharon M. Trewin It is certified that error appears in the above-identified patent and that said Letters Patent is hereby corrected as shown below:

Column 13,
Lines 52-53, "imperceptoble tp a iser" should read -- imperceptible to a user --.

Signed and Sealed this

Sixth Day of December, 2005

JON W. DUDAS
*Director of the United States Patent and Trademark Office*